US011987082B2

(12) United States Patent
Kemp et al.

(10) Patent No.: US 11,987,082 B2
(45) Date of Patent: May 21, 2024

(54) PRESSURE AND TEMPERATURE MEASURING SYSTEM

(71) Applicants: Adam M. Kemp, Boardman, OH (US); Justin T. Gloeckner, Lisbon, OH (US); Justin Thaler, East Liverpool, OH (US); Tyler Young, Canfield, OH (US); Kenneth J. Coyne, Kent, OH (US)

(72) Inventors: Adam M. Kemp, Boardman, OH (US); Justin T. Gloeckner, Lisbon, OH (US); Justin Thaler, East Liverpool, OH (US); Tyler Young, Canfield, OH (US); Kenneth J. Coyne, Kent, OH (US)

( * ) Notice: Subject to any disclaimer, the term of this patent is extended or adjusted under 35 U.S.C. 154(b) by 439 days.

(21) Appl. No.: 17/402,697

(22) Filed: Aug. 16, 2021

(65) Prior Publication Data

US 2022/0048342 A1 Feb. 17, 2022

Related U.S. Application Data

(60) Provisional application No. 63/066,392, filed on Aug. 17, 2020.

(51) Int. Cl.
*B60C 23/04* (2006.01)
*B60C 23/20* (2006.01)

(52) U.S. Cl.
CPC ...... *B60C 23/0496* (2013.01); *B60C 23/0479* (2013.01); *B60C 23/20* (2013.01)

(58) Field of Classification Search
CPC . B60C 23/0496; B60C 23/0479; B60C 23/20; G01L 17/00
See application file for complete search history.

(56) References Cited

U.S. PATENT DOCUMENTS

| | | | | | |
|---|---|---|---|---|---|
| 7,467,034 | B2 * | 12/2008 | Breed | ................ | B60C 23/0408 701/29.6 |
| 8,763,661 | B2 * | 7/2014 | Richardson | ........... | B60C 23/131 152/415 |
| 9,039,392 | B2 * | 5/2015 | Richardson | ........... | B60C 23/127 417/413.1 |
| 10,124,632 | B2 * | 11/2018 | Tsujita | ................ | B60C 23/0483 |
| 10,457,103 | B2 * | 10/2019 | Liu | ..................... | B60C 23/0489 |
| 10,913,315 | B1 * | 2/2021 | Del Olmo | ......... | B60C 23/00354 |
| 2017/0282855 | A1 * | 10/2017 | Barrios | ............... | B60C 23/0418 |
| 2018/0096542 | A1 * | 4/2018 | Mader | ..................... | G06F 21/31 |
| 2021/0116330 | A1 * | 4/2021 | Lesesky | ................ | G01M 17/02 |
| 2021/0402832 | A1 * | 12/2021 | Stalnaker | ............ | B60C 23/0476 |
| 2021/0407226 | A1 * | 12/2021 | Zhang | .................... | G06Q 10/20 |
| 2023/0226860 | A1 * | 7/2023 | Lesesky | .............. | B60C 23/0479 340/442 |

* cited by examiner

*Primary Examiner* — Mussa A Shaawat
(74) *Attorney, Agent, or Firm* — Brennan, Manna & Diamond, LLC

(57) ABSTRACT

The present invention relates generally to a tire pressure and temperature measuring system. More specifically, the system is comprised of an ergonomic and durable tire pressure and temperature gauge that does not require any external buttons, displays, or indicia, and that is capable of measuring the internal pressure and air temperature of a tire. The system is further comprised of an accompanying mobile application or computer-based software program that allows the collected pressure and/or temperature data to be wirelessly transmitted and formatted into a report that is accessible via a user interface on a remote device. The system is also capable of making recommendations to the user based on the collected pressure and/or temperature data.

18 Claims, 14 Drawing Sheets

PRESSURE AND TEMPERATURE MEASURING SYSTEM

CROSS-REFERENCE TO RELATED APPLICATION

The present application claims priority to, and the benefit of, U.S. Provisional Application No. 63/066,392, which was filed on Aug. 17, 2020 and is incorporated herein by reference in its entirety.

FIELD OF THE INVENTION

The present invention relates generally to a pressure and temperature measuring system for use with a vehicle tire. More specifically, the invention relates to an ergonomic and durable tire pressure and temperature gauge that is capable of measuring both the internal tire pressure and temperature of a mounted tire and wirelessly transmitting the information to a remote device. Even more specifically, the invention further comprises a mobile application and/or computer-based software program that allows the collected pressure and/or temperature data to be formatted wirelessly into a report using a user interface, and to be shared via a plurality of mediums such as text, email, cloud, etc. In addition, the software/application also makes recommendations to the user with respect to adjusting the tire pressure to account for such external factors as regional ambient air temperature. Accordingly, the present specification makes specific reference thereto. However, it is to be appreciated that aspects of the present invention are also equally amenable to other like applications, devices and methods of manufacture.

BACKGROUND OF THE INVENTION

Tire pressure is an often-overlooked aspect of a vehicle that is crucial to overall vehicle safety. For example, low tire pressure can lead to a large portion of a tire's surface area coming into frequent contact with a roadway, which in turn increases friction and can cause a tire to overheat and/or result in premature tire wear, tread separation or a tire blowout, etc. In contrast, high tire pressure can cause less surface area of the tire to contact the ground, which could greatly influence tire traction, vehicle stability, stopping ability and/or cause the vehicle to "bounce" along the roadway instead of maintaining consistent contact. Therefore, it is apparent that maintaining an appropriate tire pressure at all times is paramount to optimal tire performance and overall vehicle safety. This is particularly true for heavier load-bearing vehicles (e.g., semi-trucks or other industrial/construction vehicles), wherein tire air pressure must be maintained at all times at a specific rated pressure in relation to the weight-bearing capacity of the vehicle.

Accordingly, a number of gauges exist in the art which are specifically designed to measure the internal pressure of a vehicle tire. These pressure gauges typically attach to the valve stem of the tire and measure the internal air pressure of the vehicle tire, either mechanically or electronically. For example, a mechanical tire pressure gauge is typically comprised of a robust external body that houses an internal measuring member, wherein the measuring member extends outwards from the body when attached to a tire stem valve and is comprised of a plurality of indicia, typically in the form of PSI (pounds per square inch) values. The indicia allows a user to determine the current internal tire pressure of the tire via the amount of indicia visible on the measuring member, which is extended from the body a distance away that is proportional to and caused by the amount of air pressure currently within the tire.

Although robust in construction, manual tire pressure gauges have a number of inherent limitations. For example, the PSI measurement derived from the visual indicia is only accurate to the precision of the indicia (i.e., typically two PSI), and the ability of the user to accurately and manually read (+/−5 psi) the indicia. Therefore, many users favor the use of an electronic tire pressure gauge. Like mechanical gauges, electronic tire pressure gauges also attach to the valve stem of a tire, but are further comprised of a digital screen or display that produces a pressure reading (typically in PSI) that is substantially more accurate than a similar readout from a mechanical gauge on the order of at least 1 significant figure/digit.

However, like mechanical tire pressure gauges, electronic pressure gauges also suffer from their own inherent limitations and drawbacks. For example, one drawback of an electronic gauge is the possibility of the digital screen or display becoming cracked or damaged in the field by, for example, the mere dropping of the device onto the ground. If the display is damaged, the electronic tire pressure gauge is oftentimes rendered useless to the user. In addition, the body of such electronic gauges are often comprised of a relatively thin plastic, which can be easily damaged if dropped, thereby exposing and possibly dislodging the critical internal components of the gauge and leading to its inoperability.

Further, both mechanical and electronic tire gauges lack the capability of measuring the internal air temperature of the tire. As is well-known in the study of physics, pressure is directly and proportionally related to temperature at a constant volume. In general, tires lose or gain one PSI for every 10 degree change in temperature (i.e. ambient temperature). Theoretically, tires can gain two PSI over the course of the day if the temperature rises 20° F.—a real possibility in many parts of the country. As such, any increase in temperature can proportionally affect the volume and pressure of a tire, and vice versa. Therefore, it is desirable for a tire pressure device to be capable of also measuring internal tire temperature so that appropriate adjustments can be made to the tire's internal air pressure to accommodate for the particular environment in which it will operate. For example, it may be necessary to overfill or underfill the tire in terms of air pressure to compensate for the ambient air temperature and/or internal air temperature of the tire.

Therefore, there exists a long felt need in the art for an improved tire gauge device for measuring the internal air pressure of a tire. There is also a long felt need in the art for an improved tire pressure device that overcomes the plurality of inherent limitations associated with existing mechanical and electronic tire pressure gauges, such as measurement accuracy and durability. Additionally, there is a long felt need in the art for an improved tire gauge device that measures not only the internal tire pressure of a tire, but also the internal temperature of the tire. Finally, there is a long felt need in the art for a tire pressure and temperature measuring system that is capable of wirelessly transmitting the collected data to a remote device where it may be processed, stored, displayed and used to make recommendations to the user.

More specifically, the present invention discloses a tire pressure and temperature measuring system that is comprised of a gauge that can attach to a tire valve stem, and an accompanying mobile application for smart devices and/or software program that allows a user to view the measurements collected by the system, and receive recommendations relative to the same. In addition, the gauge portion of the system is comprised of a robust and ergonomic generally spherical exterior that includes no readily damageable surfaces or displays, or any measuring indicia.

In one exemplary embodiment, the present invention discloses an improved tire gauge device and accompanying mobile application for a smart devices and/or a computer-based software program. The tire gauge device is further comprised of a generally spherical or bulbous body that is further comprised of two removable halves that protect an internal circuit board, a plurality of temperature and pressure sensors, processors, and a battery for powering the same, wherein the body lacks any external buttons or displays. The body is further comprised of a threaded member that can be inserted into an existing air chuck or air pressure vessel attachment, which can in turn be attached a valve stem of a tire to measure its internal air pressure and/or temperature. More specifically, the plurality of sensors and processors measure the tire's internal air pressure and temperature in absolute or gauge pressure outputs. The measurements can then be sent to, and viewed on, an accompanying mobile smart device application or computer-based software via a wired or a wireless connection such as, without limitation, Wi-Fi, Bluetooth, RFID, or other existing wireless technology. The software/mobile application also allows a user to store the collected data, as well as input the data into a report that can be shared with others via a cloud server, an email, a text message, etc. The software/mobile application is also capable of processing the collected data and making recommendations to the user regarding potential adjustments to the internal air pressure of the tire to, for example, account for certain environmental conditions.

In this manner, the pressure and temperature measuring system of the present invention accomplishes all of the forgoing objectives. More specifically, the pressure and temperature measuring system of the present invention provides for a more accurate and durable tire pressure and temperature measuring device that is less susceptible to breakage/damage than existing gauges, and that allows a user to measure, record, display and transmit data pertaining to the internal air pressure and internal temperature of a tire, as well as receiving recommendations regarding the same.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a tire pressure and temperature measuring system that is comprised of a gauge that can attach to a tire valve stem, and an accompanying mobile application for smart devices and/or software program. More specifically, the tire gauge preferably comprises a generally spherical/bulbous body that is further comprised of a plurality of continuous openings which allow the two halves to be secured to one another in a unified fashion. The first half of the body is comprised of a fixed male threaded member that can be attached to an existing air chuck, wherein the threaded member is further comprised of a continuous opening that allows air to reach the central cavity of the device by a passive means when the chuck is connected to a tire valve stem. The central cavity is comprised of a plurality of pressure and temperature sensors in communication with a circuit board that can measure the internal temperature and pressure of the tire to which it is attached. The measurements taken by the sensors can then be transferred via a Wi-Fi, Bluetooth, radio frequency, or other connection to an accompanying mobile application (i.e. app)/computer-based software. The software/application then allows a user to view the measurements and create a report regarding the findings. The software/mobile application is also capable of suggesting appropriate adjustments to the tire pressure to the user.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
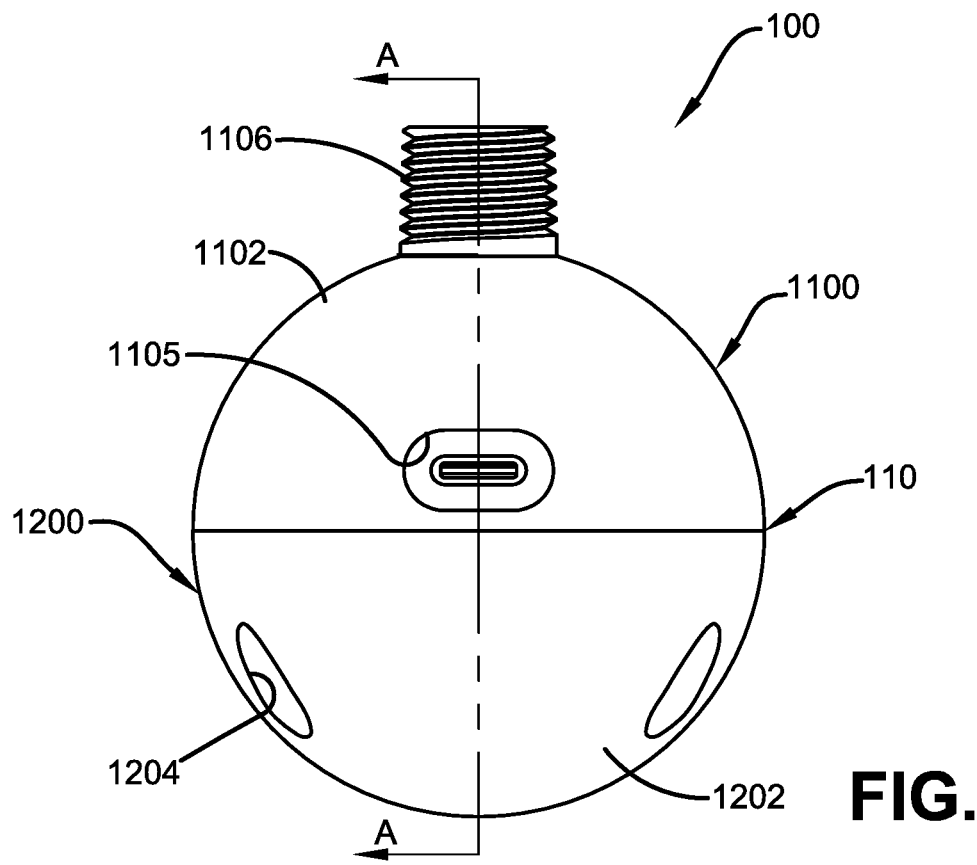
FIG. 1 illustrates a perspective view of one potential embodiment of the tire pressure gauge of the system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there exists a need in the art for an improved tire pressure gauge that offers a more durable and accurate alternative to existing tire pressure gauge devices known in the art. There also exists a need in the art for an improved tire pressure gauge that measures the internal temperature of the air in a tire, as such information is crucial to predicting tire and vehicle performance, as mentioned supra. Finally, there is a long felt need in the art for a tire pressure and temperature measuring system that is capable of wirelessly transmitting the collected data to a remote device where it may be processed, stored, displayed and used to make recommendations to the user.

The system of the present invention is designed to allow a user to easily and readily measure the internal air pressure and temperature of a tire via a gauge that is exceptionally durable/robust, accurate, and ergonomic. The gauge device is comprised of a generally cylindrical/bulbous ergonomic body that is further comprised of a first half and a second half, wherein the two halves are secured together in a unified fashion via one or more fasteners or other securing means (e.g., snap fit, adhesive, epoxy potting, and the like). The fasteners enter the device via a plurality of continuous openings in the second half of the device, and are secured to the first half by being fastened to a plurality of threaded female receptacles which are contained within the body of the first half. The first half of the device is also comprised of an integrated threaded member which allows the device to be readily attached to the female end of an existing air chuck, thereby allowing the device to be used with various air compressor/tire pressure vessel valve attachments known in the art. The threaded member is also comprised of a continuous opening that travels from the top surface of the member to a central cavity of the device. The central cavity of the device houses a circuit board assembly, which is comprised of a plurality of temperature and pressure sensors/processors which detect the air temperature and/or pressure within the tire.

Once the appropriate measurements/readings have been gathered via the temperature and pressure sensors/processors, the device can then transmit the readings via a Wi-Fi, low energy Bluetooth, radio frequency, or other transmission means to an accompanying computer-based software program or mobile app for a smart device. The software/mobile application or app provides a user with a user interface that can be used on and in conjunction with a plurality of operating systems such as, but not limited, to Android, IOS, Windows, etc., to create an individual report relative to the readings taken by the device (e.g., for each tire, or for all of the vehicle's tires), wherein the data may be recorded, stored, processed, displayed, shared with others, and/or used to make recommendations to the user. For example, it is contemplated that the data can be stored in the form of a cloud-based database and that the report can be transmitted to various remote users/devices via a communication means such as, but not limited to, an email, a text message, cloud sharing, file transferring, etc. Additionally, the software/mobile application may further transmit the recorded data to a digital measuring device to allow for the programming of various settings and controlling of the digital measuring device.

Additionally, and as noted in the drawings, the tire pressure and temperature gauge lacks any external buttons, displays, indicia, etc. that could be damaged to render the device inoperative or unusable. In addition, the robust and relatively thick. generally-spherical/bulbous body of the gauge device protects the internal components (e.g., the circuit board assembly, sensors, processors, battery, etc.) from damage related to being dropped, or other damage that could occur in a working environment.

Referring initially to the drawings, FIG. 1 illustrates a perspective view of one potential embodiment of the tire pressure and temperature gauge 100 portion of the inventive system. The device 100 is comprised of a generally-spherical/bulbous body 110 that is further comprised of a first half 1100 having an exterior surface 1102, and a second half 1200 having an exterior surface 1202. As mentioned supra, the exterior surfaces 1102, 1202 are absent of any buttons, displays, switches, etc. which could be damaged during use.

Figure 2:
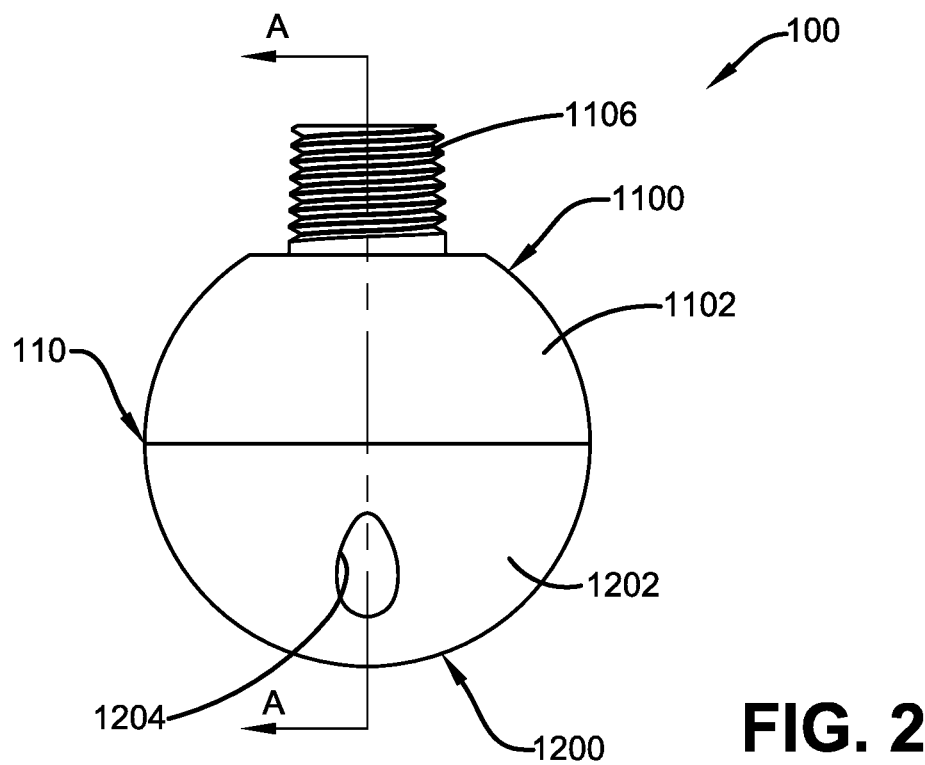
FIG. 2 illustrates a side perspective view of one potential alternative embodiment of the tire pressure gauge of the present invention in accordance with the disclosed architecture.

The second half 1200 of the body 110 is further comprised of a plurality of radially spaced-apart continuous openings 1204 for the receipt of fasteners 150, which are explained more fully below. The exterior surface 1202 of the second half 1200 of the body 110 is also comprised of a charging port opening 1205 for a USB port or other similar port, which will also be elaborated on more fully below. FIG. 2. displays a side perspective view of an alternative embodiment of the tire pressure gauge device 100 that lacks a charging port opening 1205 for embodiments of the device 100 that may not be comprised of USB capabilities. In addition, it is contemplated that the body 110 may be comprised of a relatively lightweight and durable material, such as a plastic or a polymer, that may be formed by an injection molding or additive manufacturing process.

Figure 3:
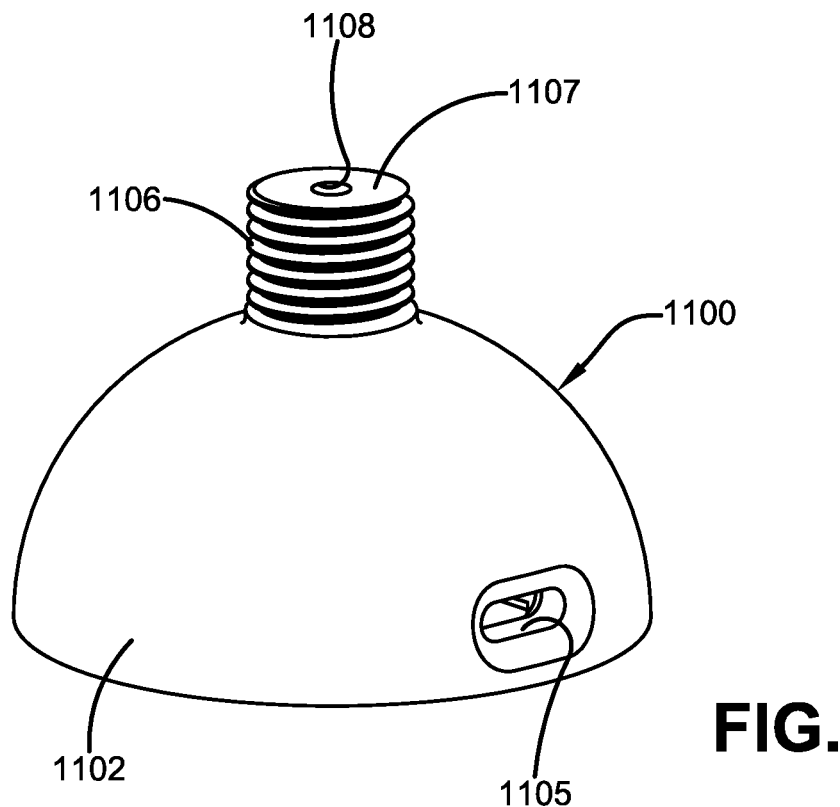
FIG. 3 illustrates a perspective top view of one potential embodiment of the first half of the body portion of the tire pressure gauge of the present invention in accordance with the disclosed architecture.
Figure 15:
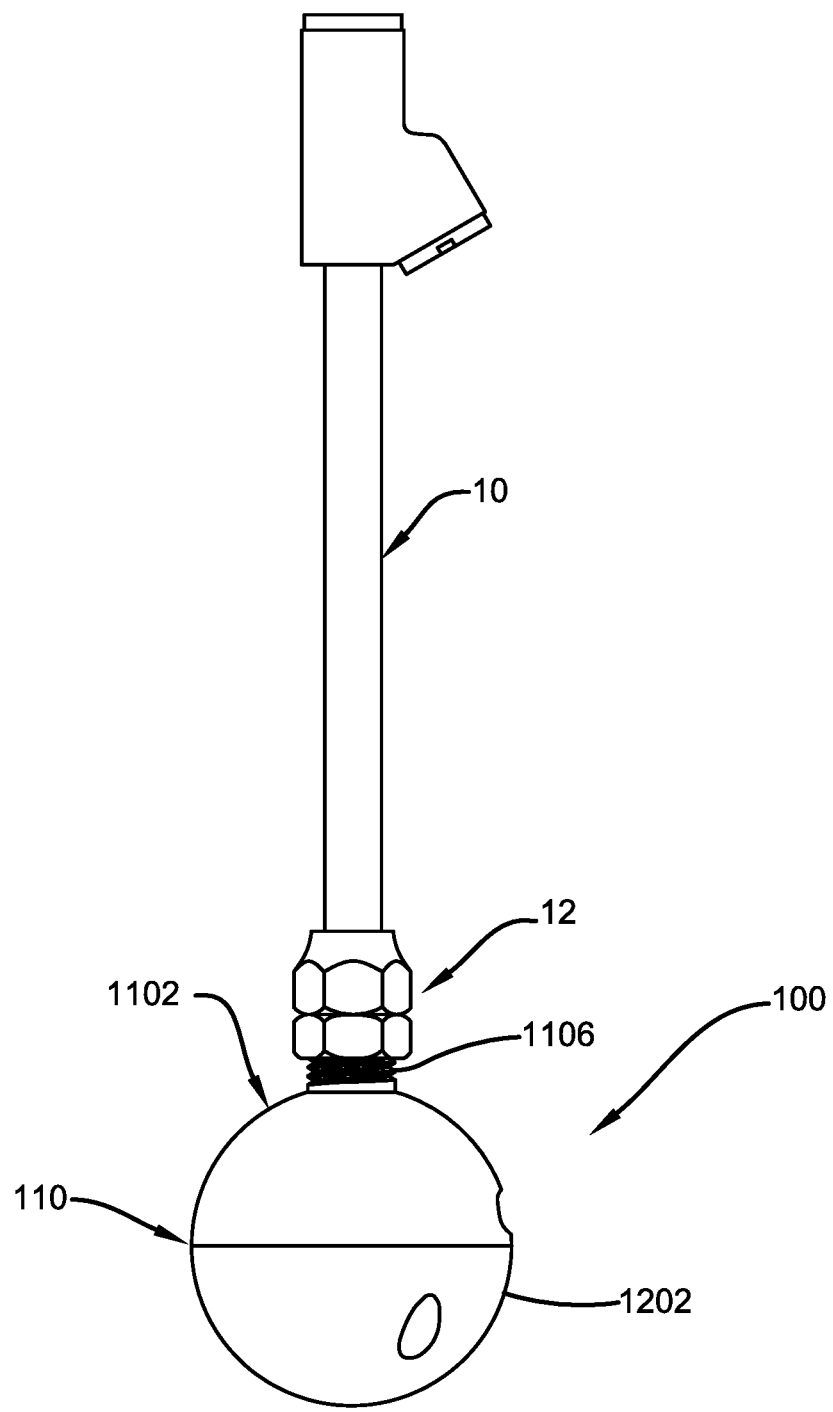
FIG. 15 illustrates a perspective view of one potential embodiment of the tire pressure gauge of the present invention attached to an air chuck (shown as prior art) in accordance with the disclosed architecture.

FIG. 3 illustrates a perspective top view of one potential embodiment of the first half 1100 of the tire pressure gauge device 100. Here, the threaded member 1106 can be fully observed, and is preferably comprised of a threaded rod that is fixedly attached to the flat surface 1103 of the first half 1100. The member 1106 allows the device 100 to be attached to a plurality of industry-known pressure vessel valves, valve attachments and air chucks 10 (as best shown in FIG. 15), wherein the member 1106 is affixed to the female-threaded receiving end 12 of the air chuck 10. The threaded member 1106 also allows the user to attach the device 100 to a plurality of connections/connectors known within the tire/automobile/equipment industry such as, but not limited to, NPT Threads and Quick Connect-type couplers. In addition, the exterior surface 1102 of the first half 1100 may also be comprised of a USB port and charging port opening 1105.

Figure 4:
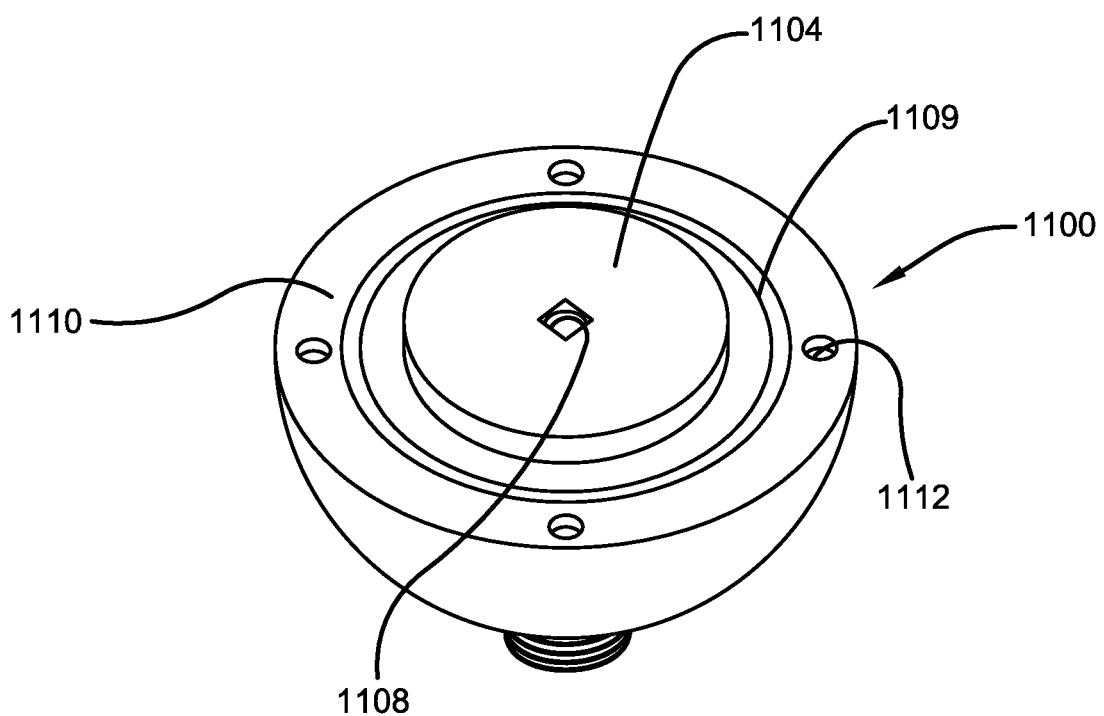
FIG. 4 illustrates a perspective bottom view of one potential embodiment of the first half of the tire pressure gauge of the present invention in accordance with the disclosed architecture.

FIG. 4 illustrates a perspective bottom view of one potential embodiment of the first half 1100 of the tire pressure gauge device 100. The bottom surface 1110 is further comprised of a continuation of the continuous opening 1108 of the threaded member 1106, a plurality of radially spaced apart receptable openings 1112 for receipt of fasteners 150 to secure the first half 1100 to the second half 1200, and a gasket channel 1109. The gasket channel 1109 houses a rubber (or other sealing material) gasket 160, which is used to prevent contamination from entering the central cavity 1208. The bottom surface 1110 is also comprised of a spacer extrusion 1104 that aids in keeping the contents of the device 100 secure, and whose purpose will be explained more fully below.

Figure 5A:
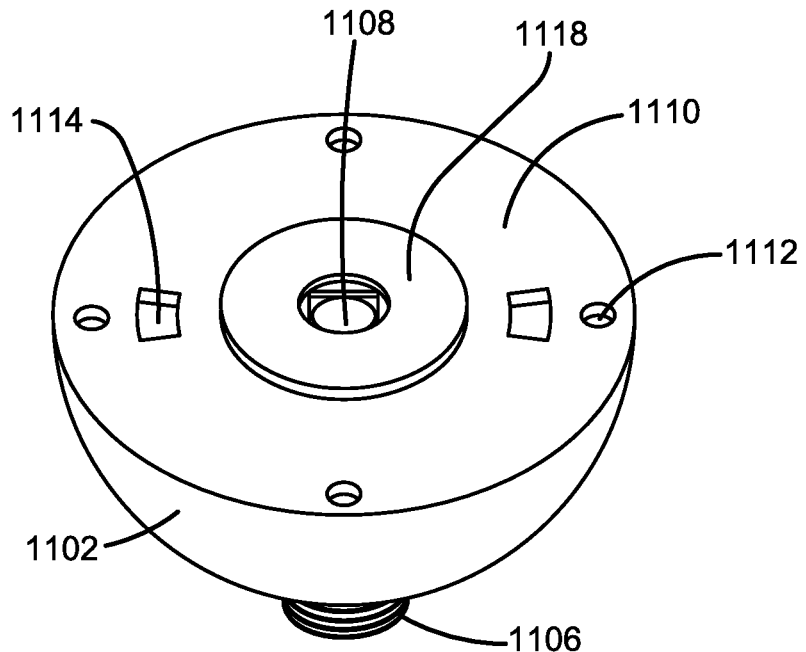
FIG. 5A illustrates a perspective bottom view of the first half of an alternative embodiment of the tire pressure gauge of the present invention in accordance with the disclosed architecture.
Figure 5B:
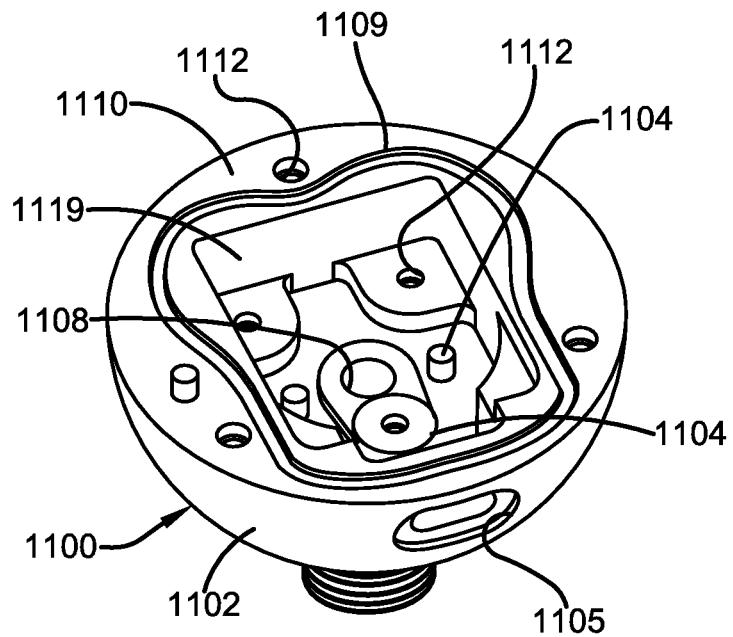
FIG. 5B illustrates a perspective bottom view of the first half of one potential embodiment of the tire pressure gauge of the present invention in accordance with the disclosed architecture.

Alternative embodiments of the bottom surface 1110 of the first half 1100 are illustrated in FIG. 5A and FIG. 5B. Like the preferred embodiment of the device 100, the bottom surface 1110 is still comprised of a plurality of radially spaced-apart and receptable openings 1112 which receive fasteners 150 to secure the first half 1100 to the second half 1200. In contrast, the bottom surface 1110 in this alternative embodiment is further comprised of at least two anti-rotational indents 1114 whose purpose will be explained more fully below. The surface 1110 is also comprised of a fixed spacer ring 1118 that is attached to the bottom surface 1110 to act in the same manner as the rubber gasket 160 and to prevent air from exiting the device 100. Further, the surface 1110 may also be comprised of a plurality of sidewalls 1119.

Figure 6:
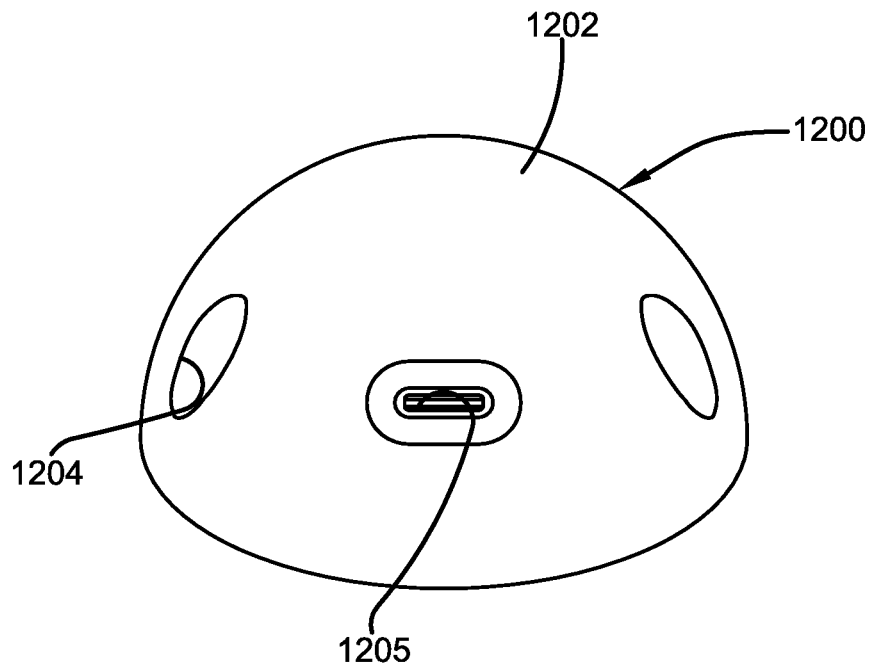
FIG. 6 illustrates a perspective bottom view of one potential alternative embodiment of the second half of the tire pressure gauge of the present invention in accordance with the disclosed architecture.
Figure 7A:
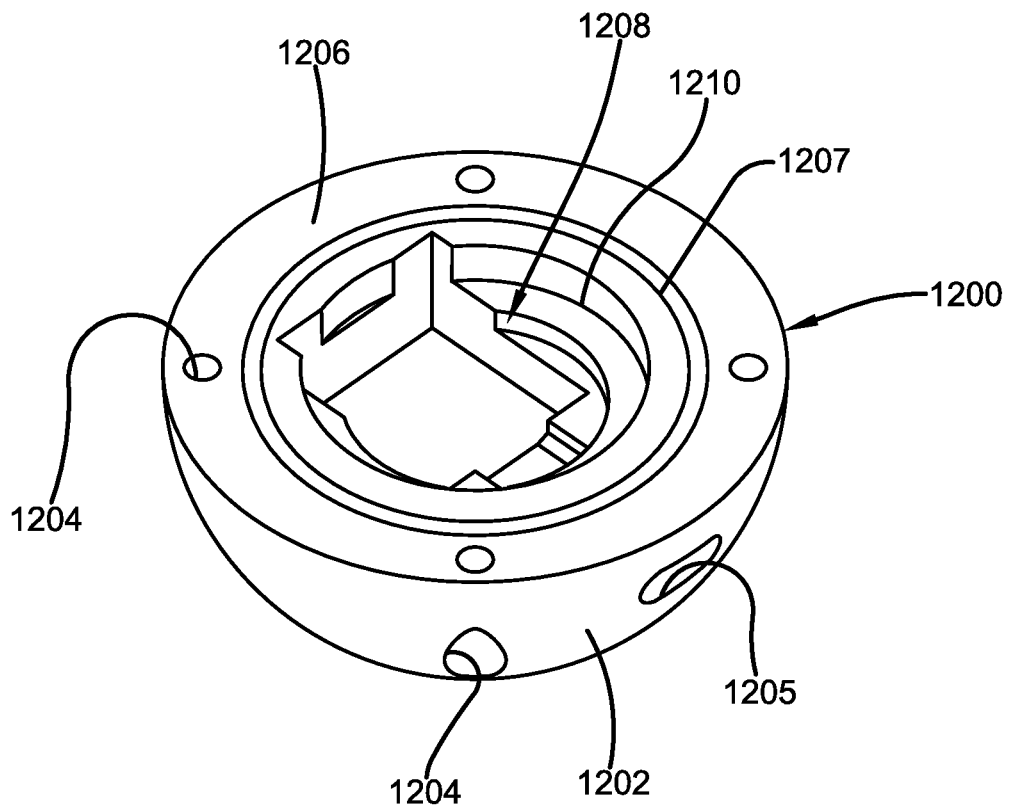
FIG. 7A illustrates a perspective top view of one potential alternative embodiment of the second half of the tire pressure gauge device of the present invention in accordance with the disclosed architecture.
Figure 7B:
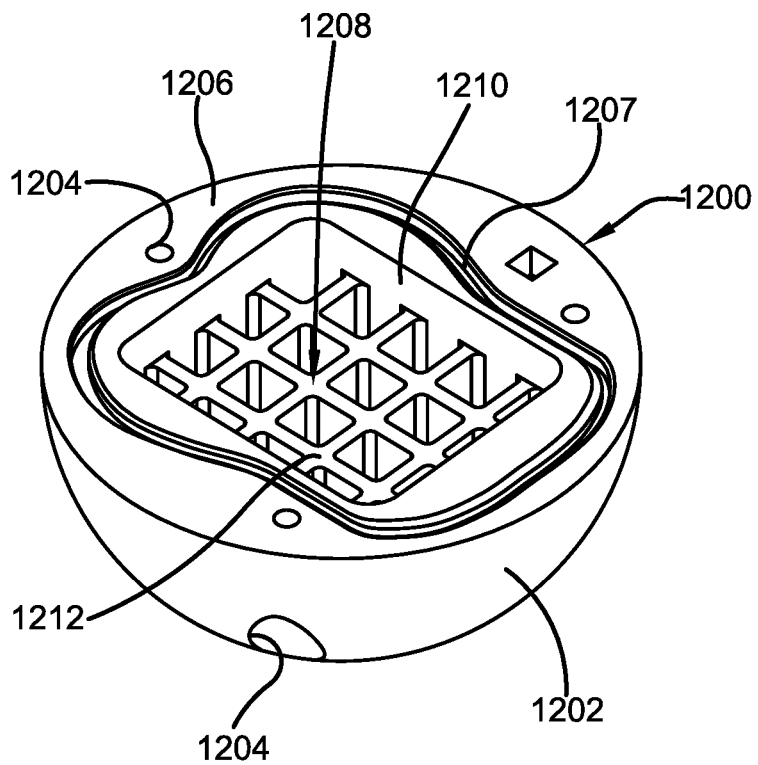
FIG. 7B illustrates a perspective top view of one potential embodiment of the second half of the tire pressure gauge device of the present invention in accordance with the disclosed architecture.
Figure 8:
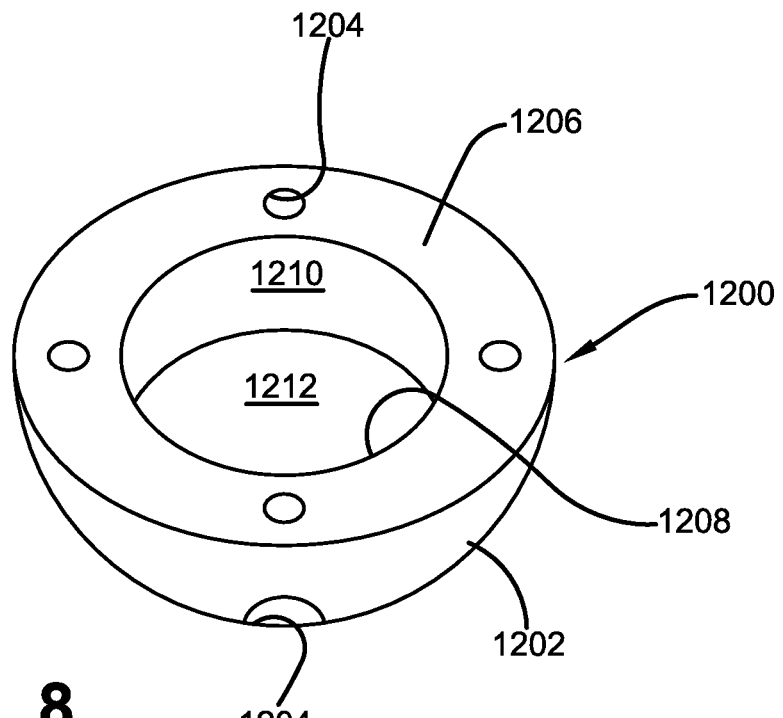
FIG. 8 illustrates a perspective top view of one potential alternative embodiment of the second half of a differing embodiment of the tire pressure gauge of the present invention in accordance with the disclosed architecture.

FIG. 6 illustrates a perspective bottom view of one potential alternative embodiment of the second half 1200 of the tire pressure gauge device 100. Here the continuous fastener openings 1204 can be observed, which allow fasteners 150 to be inserted through the second half 1200 of the device 100 and into the first half 1100, where they are received by the receptable openings 1112. Further, a perspective top view of two alternative embodiments of the second half 1200 of the tire pressure gauge device 100 can be observed in FIG. 7A and FIG. 7B. Here it can be seen how the continuous openings 1204 continue to extend through the top surface 1206 of the second half 1200, thereby allowing the fasteners 150 to be received by the receptacle openings 1112. The second half 1200 is further comprised of a central internal cavity 1208 which houses a battery 140 and a circuit board assembly 120. The central internal cavity 1208 is further comprised of a plurality of sidewalls 1210 and a bottom surface 1212, which are contoured to accommodate the exterior body shape of the battery 140 and the circuit board assembly 120. A continuous opening 1205 also exists to accept the charging port 121 and extends from the outer surface 1202 to the central cavity 1208. FIG. 8 illustrates a perspective top view of one potential alternative embodiment of the second half 1200 of a differing embodiment of the tire pressure gauge 100 that lacks the charging port opening 1205.

Figure 9:
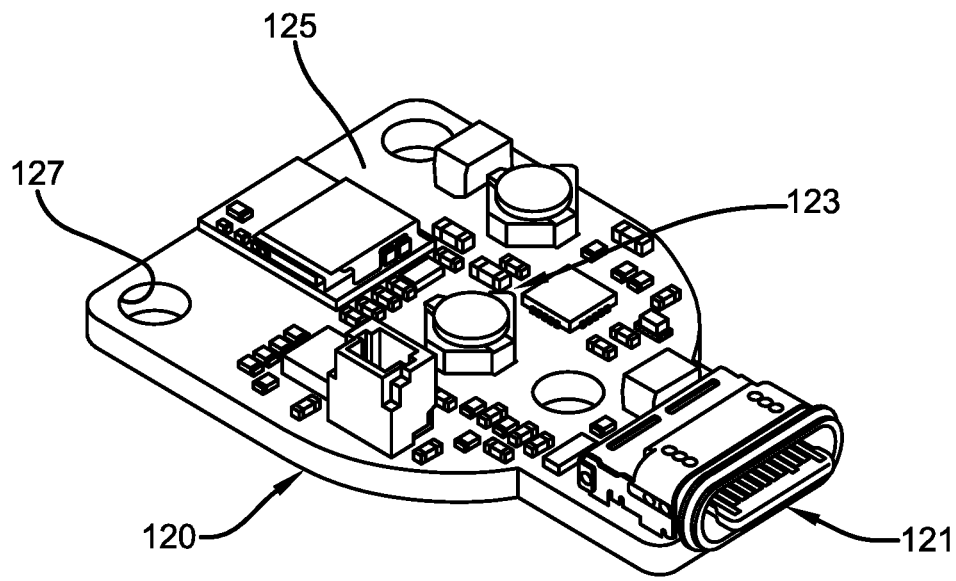
FIG. 9 illustrates a bottom perspective view of one potential embodiment of the circuit board assembly of the tire pressure gauge of the present invention in accordance with the disclosed architecture.
Figure 10:
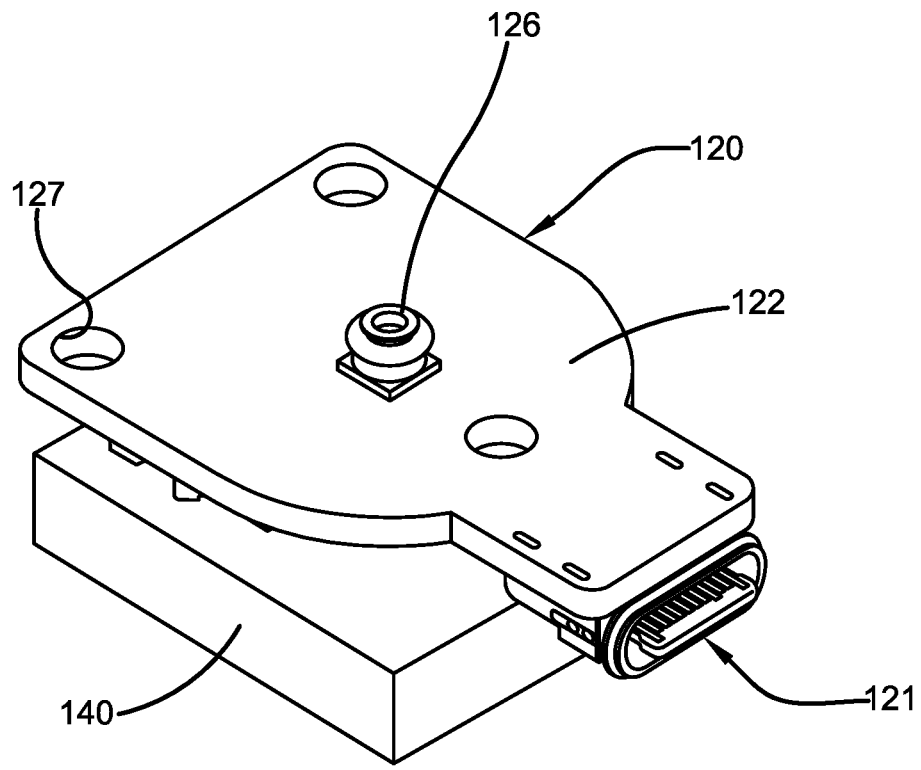
FIG. 10 illustrates a perspective view of one potential embodiment of the circuit board assembly and battery of the tire pressure gauge of the present invention in accordance with the disclosed architecture.

FIG. 9 illustrates a bottom perspective view of one potential embodiment of the circuit board assembly 120 of the tire pressure gauge 100. The circuit board assembly 120 is preferably comprised of a USB port 121, and a plurality of temperature and integrated circuit chips 123 located on a bottom surface 125 of the board assembly 120. FIG. 10 illustrates a top perspective view of one potential embodiment of the circuit board assembly 120 and battery 140 of the tire pressure gauge 100. In this view, the top surface 122 of the circuit board 120 can be fully observed, and is further comprised of a sensor 126 that allows air from the tire to enter the integrated circuit chips 123 from the continuous opening 1108 of the threaded member 1106.

In one embodiment, one or more of the plurality of integrated circuit chips 123 may also be capable of detecting motion, a pressure above atmospheric pressure and/or track time. For example, integrated circuit chips 123 may be capable of detecting motion such that the device 100 can be gently shaken to activate or turn the same ON. Similarly, the device 100 may be activated if integrated circuit chips 123 detects a pressure above atmospheric pressure, such as when the device 100 is applied to a tire. Further, the device 100 may power OFF after a user specified period of time, which may be tracked by one of the plurality of integrated circuit chips 123. This feature, in particular, will help conserve battery life as described more fully below The circuit board 120 is powered by, fixedly attached to, and in electrical communication with a battery 140 or other electrical source. The battery 140 is preferably a lithium ion battery, but other types of batteries are also contemplated. Further, in differing embodiments of the device 100, the battery 140 may be rechargeable or non-rechargeable, wherein the battery may be charged by a USB connection to the USB charging port 121 of the circuit board 120. The USB charging port 121 may accept a plurality of differing USB types such as, but not limited to, USB Type-A, USB Type-B, USB Type-C, Mini USB, etc. As noted supra, the circuit board 120 may also be comprised of a means to transport the data recorded by the integrated circuit chips 123 via Wi-Fi, low energy Bluetooth, Radio Frequency, or other means such as a USB connection via the charging port 121 to the software/mobile application of the device 100 or other wireless transmitter. The board 120 may also have a plurality of continuous fastener openings 127 to allow fasteners to engage the board 120 i.e. to allow the board 120 to attach to the battery 140.

Figure 11:
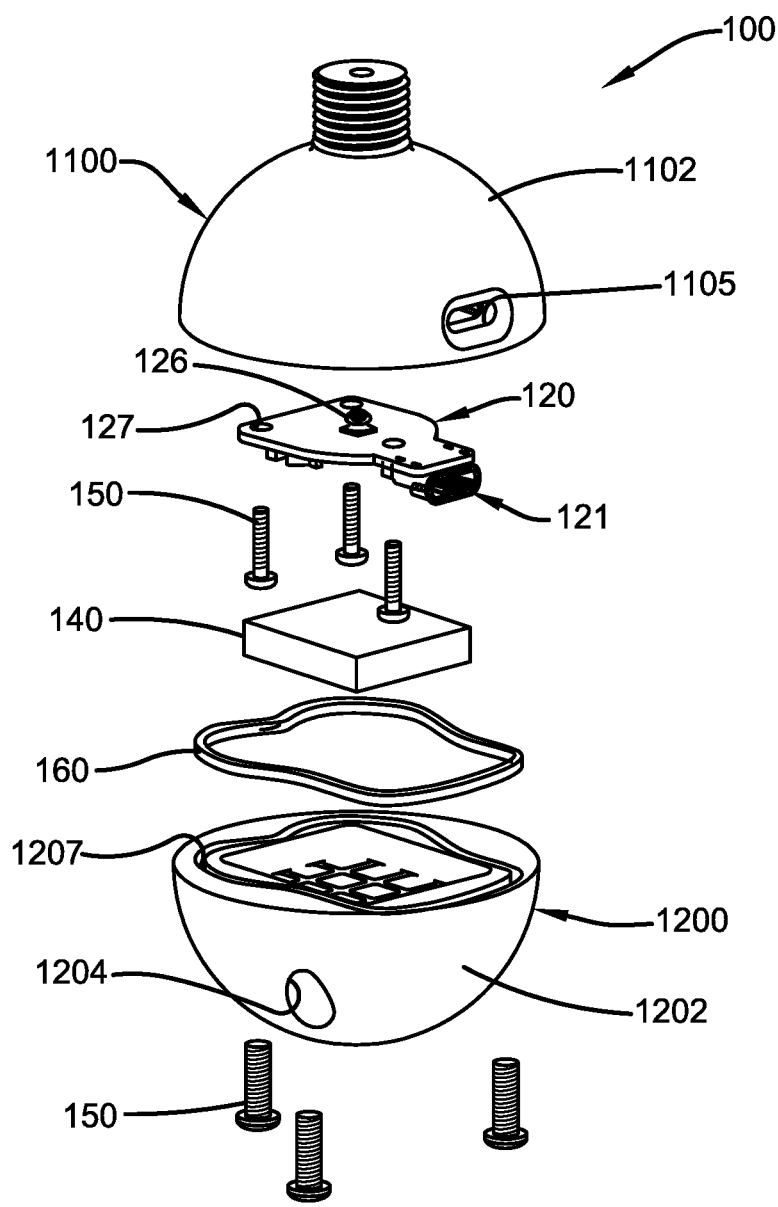
FIG. 11 illustrates an exploded view of one potential embodiment of the tire pressure gauge of the present invention in accordance with the disclosed architecture.

FIG. 11 illustrates a partially-exploded view of one potential embodiment of the tire pressure gauge 100, thereby allowing the various components and their relative position to one another to be readily observed. It can further be noted the manner in which the circuit board assembly 120, charging port 121 and battery 140 are encompassed by the central cavity 1208 of the second half 1200 of the body 110. The securing of the circuit board assembly 120, charging port 121 and battery 140 within the body 110 via the contoured sidewalls 1210 and spacer extrusion 1104 can also be observed, in addition to the position of the gasket 160. It should also be noted that the charging port opening 1205 allows the charging port 121 to extend to the outer surface 1202 of the second half 1200 to allow a USB connection to occur to charge the device 100 and/or to transfer data to and from the device 100.

Figure 12:
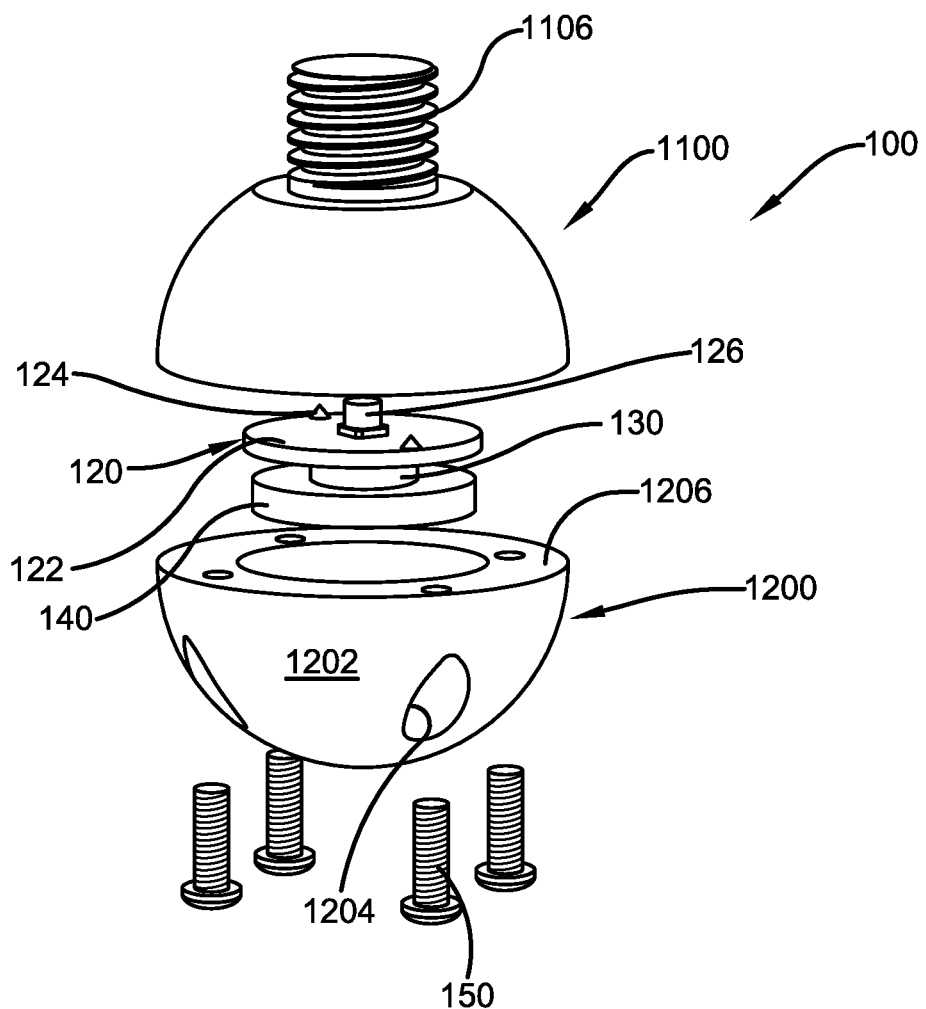
FIG. 12 illustrates an exploded view of an alternative embodiment of the tire pressure gauge of the present invention in accordance with the disclosed architecture.

FIG. 12 illustrates a partially-exploded view of an alternative embodiment of the tire pressure gauge 100 of the present invention in accordance with the disclosed architecture. In this embodiment, it should be noted that the top surface 122 of the circuit board 120 is further comprised of two generally triangular-shaped solder connections 124 which engage the two anti-rotational indents 1114 (as best observed in FIG. 5A) to prevent the rotation of the board 120 and battery 140 within the central cavity 1208. The battery 140 and circuit board 120 may also be attached to one another via a spacer/connector 130, as best seen in this particular embodiment of the device 100.

Figure 13:
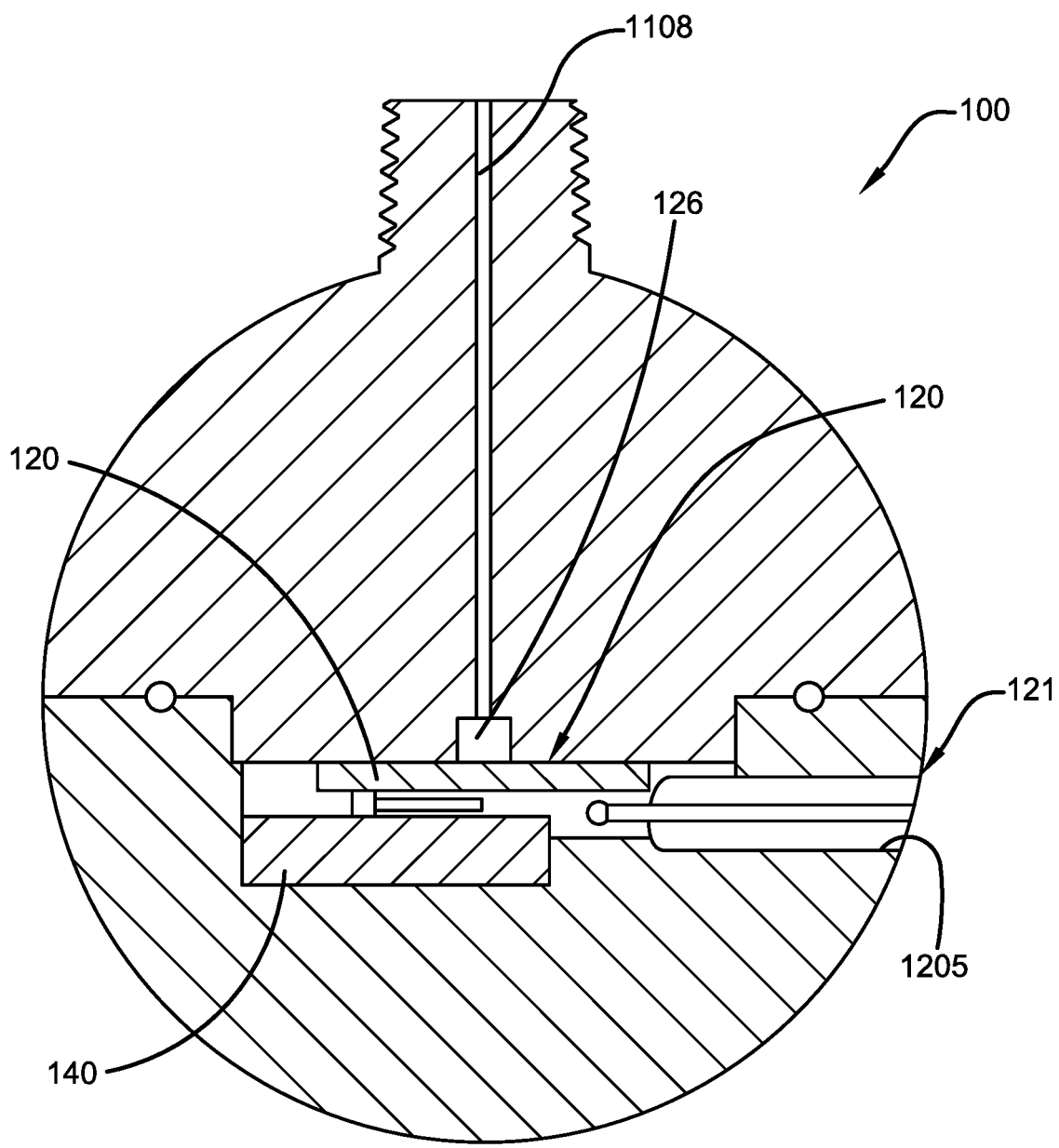
FIG. 13 illustrates a cross-sectional view of one potential embodiment, taken along line A-A of FIG. 1, of the tire pressure gauge of the present invention in accordance with the disclosed architecture.
Figure 14A:
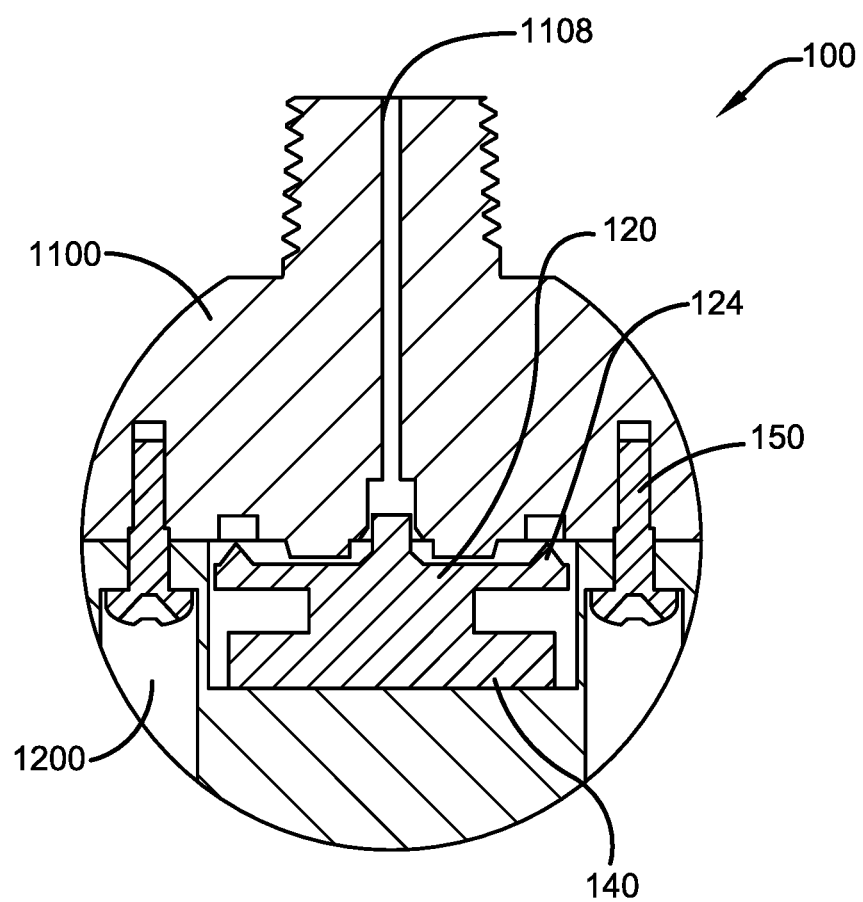
FIG. 14A illustrates a cross-sectional view of an alternative embodiment, taken along line A-A of FIG. 2, of the tire pressure gauge of the present invention in accordance with the disclosed architecture.
Figure 14B:
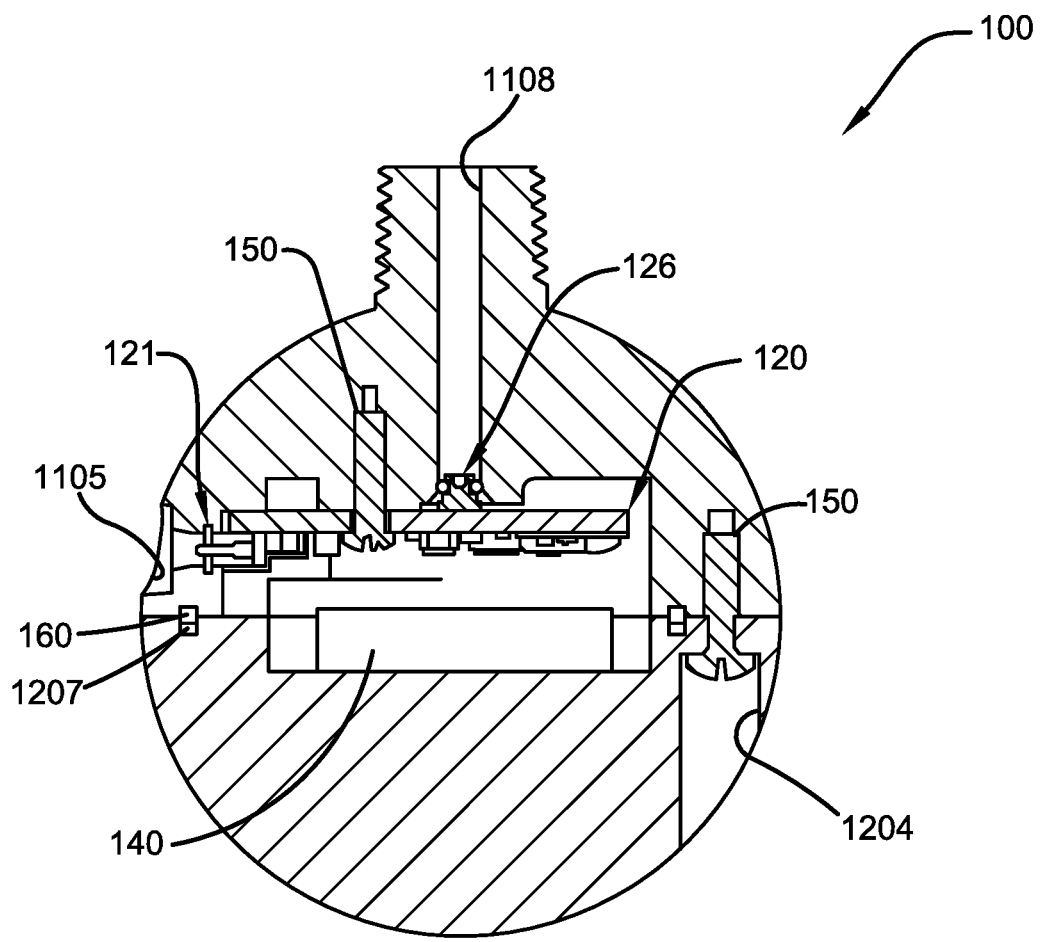
FIG. 14B illustrates a cross-sectional view of an alternative embodiment, taken along line A-A of FIG. 2, of the tire pressure gauge of the present invention in accordance with the disclosed architecture.

FIG. 13 illustrates a cross-sectional view of one potential embodiment of the tire pressure gauge 100 and displays the relationship between the continuous opening of the member 1106 which extends through the first half 1100 and into the circuit board assembly 120 via the sensor 126. This allows air to travel from the air chuck 10 or tire stem valve, through the opening 1106 and into the circuit board 120, wherein the internal temperature and tire pressure can be recorded by the integrated circuit chips 123. Similarly, FIGS. 14A and 14B displays the manner in which the fasteners 150 secure the second half 1200 to the first half 1100 in two differing embodiments of the device 100 (wherein the embodiment shown in FIG. 14A is not comprised of a USB charging port 121 and the embodiment shown in FIG. 14B is comprised of a USB charging port 121), and is further comprised of the solder connections 124 and anti-rotational indents 1114.

Figure 16:
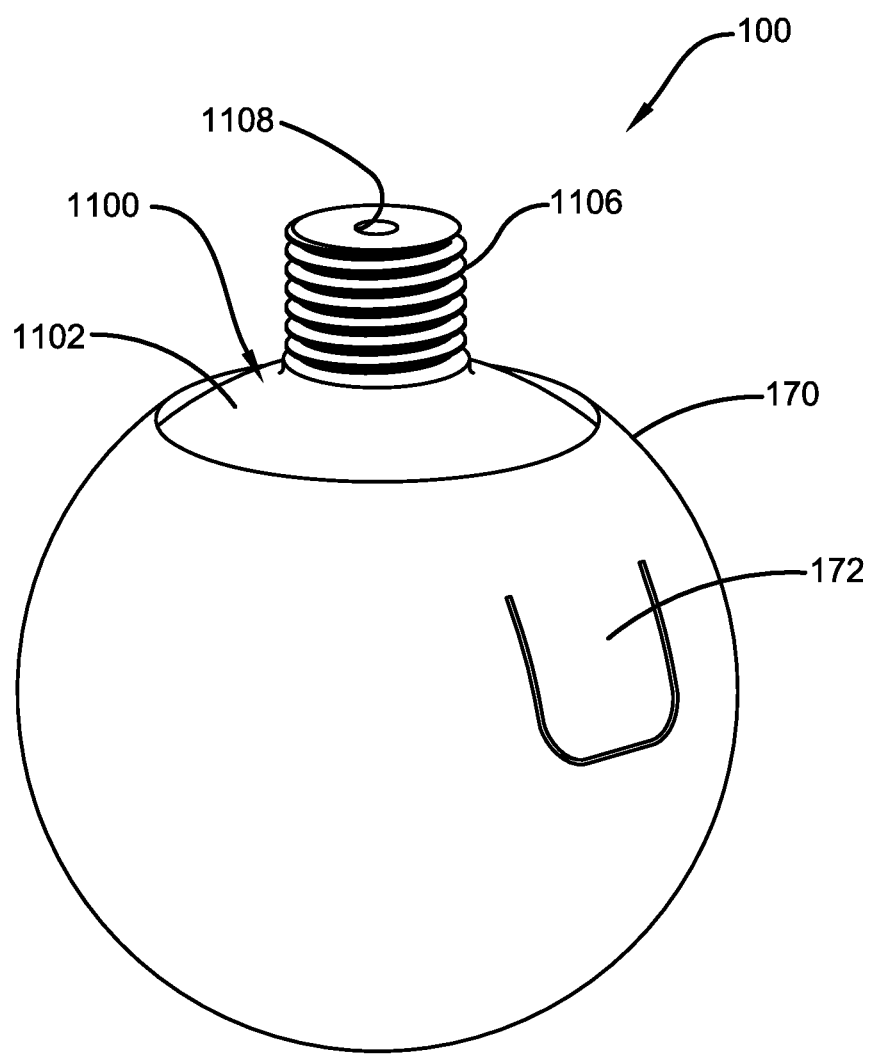
FIG. 16 illustrates a perspective view of one potential embodiment of the tire pressure gauge of the present invention enclosed by a rubber cover in accordance with the disclosed architecture.
Figure 17:
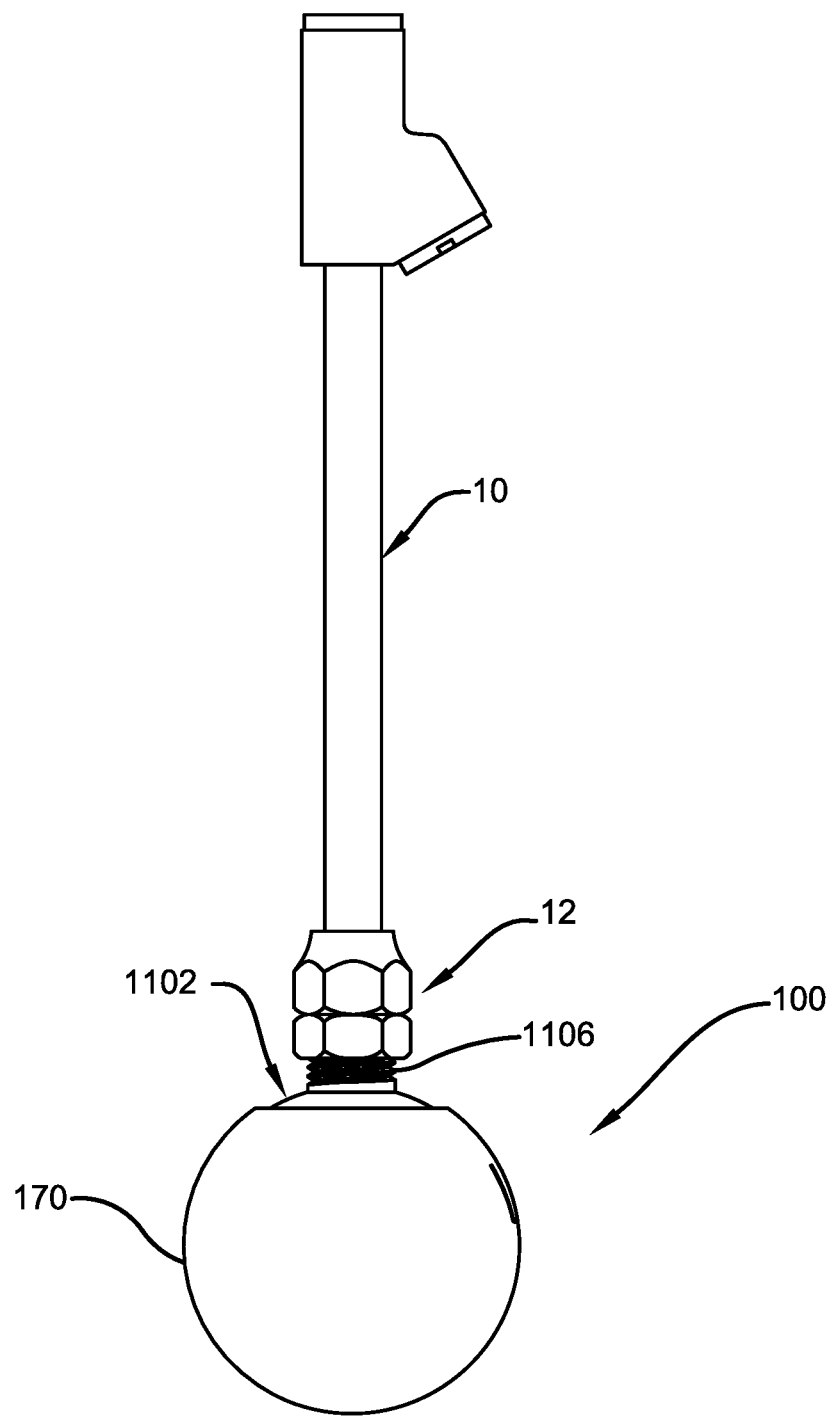
FIG. 17 illustrates a perspective view of one potential embodiment of the tire pressure gauge of the present invention enclosed by a rubber cover while attached to an air chuck (shown as prior art) in accordance with the disclosed architecture.

FIG. 16 illustrates a perspective view of one potential embodiment of the tire pressure gauge 100 of the present invention enclosed by a rubber cover 170 in accordance with the disclosed architecture. It is contemplated that the rubber cover 170 may be used to cover the outer surfaces 1102, 1202 of the device 100 such that it is protected from damage/impacts. The cover 170 may be comprised of any form of durable rubber, wherein said rubber is flexible, semi-flexible, or rigid. The cover 170 may also include a flap 172 that covers the charging port 121 when the port 121 is not in use. However, the cover 170 does not obstruct the threaded member 1106, and therefore allows the device 100 to still connect to an air chuck 10, as shown in FIG. 17.

It is to be appreciated that the aforementioned description provides a method of adjusting tire air pressure. The method comprises: measuring tire air pressure and temperature; transmitting the tire air pressure and the temperature to a mobile app; receiving the tire air pressure and the temperature on the mobile app; displaying the tire air pressure and the temperature on the mobile app; comparing the tire air pressure with the temperature; and wherein the app recommending a change to the tire air pressure based on a change to the temperature. The method further comprising distinguishing that the temperature is an ambient temperature and the change to the tire air pressure comprises an increase to the tire air pressure to correspond to a decrease in the ambient temperature. The change to the tire air pressure comprises an increase to the tire air pressure of 1 PSI for every 10 degree decrease in the ambient temperature. Conversely, the change to the tire air pressure comprises a decrease to the tire air pressure to correspond to an increase in the ambient tire temperature. The change to the tire air pressure comprises a decrease to the tire air pressure of 1 PSI for every 10 degree increase in the ambient tire temperature. Additionally, the method further comprises distinguishing that the temperature is an internal tire temperature and the change to the tire air pressure comprises an increase to the tire air pressure to correspond to a decrease in the internal tire temperature. The change to the tire air pressure comprises an increase to the tire air pressure of 1 PSI for every 10 degree decrease in the internal tire temperature. Conversely, the change to the tire air pressure comprises an increase to the tire air pressure to correspond to a decrease in the internal tire temperature. The change to the tire air pressure comprises an increase to the tire air pressure of 1 PSI for every 10 degree decrease in the internal tire temperature.

Notwithstanding the forgoing, the improved tire pressure gauge 100 and its various components can by any suitable size, shape, and configuration as is known in the art without affecting the overall concept of the invention, provided that it accomplishes the above-stated objectives. One of ordinary skill in the art will appreciate that the shape and size of the device 100 and its various components, as shown in the FIGS. are for illustrative purposes only, and that many other shapes and sizes of the device 100 are well within the scope of the present disclosure. Although dimensions of the device 100 and its components (i.e., length, width, and height) are important design parameters for good performance, the device 100 and its various components may be any shape or size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pressure and temperature measuring gauge device comprising:
  a plurality of gauge devices, wherein each one of said plurality of gauge devices comprises a body, a rubber cover, and a threaded member for mounting to a tire valve stem of a tire of a vehicle;
  each one of said plurality of gauge devices further comprising a circuit board assembly, a pressure sensor, and a temperature sensor;
  wherein said pressure sensor measures an internal air pressure of a tire mounted thereto; wherein said temperature sensor measures an internal air temperature of said tire mounted thereto;

each one of said plurality of gauge devices further comprising a battery and a transmitter for transmitting said internal air pressure and said internal air temperature of said tire mounted thereto;
a mobile app for receiving said internal air pressure and said internal air temperature of said plurality of gauge devices; and
said mobile app displays said internal air pressure and said internal air temperature of said each tire of the vehicle; and
wherein the body is a spherical body comprising a first half and a second half attachable to the first half via a plurality of fasteners; and
wherein the threaded member is attached to the first half of the spherical body at a continuous opening; and
wherein the second half of the spherical body comprises a central internal cavity configured to retain the circuit board assembly, the pressure sensor, the temperature sensor, the battery, and the transmitter.

2. The pressure and temperature measuring gauge device of claim 1, wherein said mobile app compares said internal air pressure and said internal air temperature of said plurality of gauge devices and makes a recommendation to a user.

3. The pressure and temperature measuring gauge device of claim 2, wherein the recommendation to the user is one of an increase in said internal air pressure of the tire to correspond to a decrease in said internal air temperature.

4. The pressure and temperature measuring gauge device of claim 2, wherein the recommendation to the user is one of a decrease in said internal air pressure of the tire to correspond to an increase in said internal air temperature.

5. The pressure and temperature measuring gauge device of claim 2, wherein each one of said plurality of gauge devices further comprises a charging port for charging said battery.

6. The pressure and temperature measuring gauge device of claim 5, wherein said charging port is a USB charging port.

7. A pressure and temperature measuring system comprising:
a gauge device capable of measuring each of an internal air pressure and an internal air temperature of a tire; and
a mobile app for receiving, comparing and displaying the measurements of said internal air pressure and said internal air temperature of said tire; and
wherein the gauge device comprises a body, a threaded member, a pressure sensor, a temperature sensor, a circuit board assembly, a battery, and a charging port; and
wherein the body comprises a first half and a second half attachable to the first half via a plurality of fasteners; and
wherein the first half comprises a continuous opening, a gasket channel for housing a gasket, and a spacer intrusion; and
wherein the threaded member is attached to the first half of the spherical body at the continuous opening; and
wherein the second half of the spherical body comprises a central internal cavity configured to retain the circuit board assembly, the pressure sensor, the temperature sensor, and the battery.

8. The pressure and temperature measuring system of claim 7, wherein said mobile app uses the measurements of said internal air pressure and said internal air temperature of said tire to make a recommendation to a user.

9. The pressure and temperature measuring system of claim 8, wherein said recommendation to the user is one of an increase in said internal air pressure of the tire, or a decrease in said internal air pressure of the tire.

10. The pressure and temperature measuring system of claim 7, wherein said battery is a lithium ion battery.

11. The pressure and temperature measuring system of claim 7, wherein said battery is a rechargeable battery.

12. The pressure and temperature measuring system of claim 7, wherein said gauge device is further comprised of a USB charging port.

13. A method of adjusting a tire air pressure, the method comprising:
measuring the tire air pressure and a temperature using a gauge device;
transmitting said tire air pressure and said temperature to a mobile app;
receiving said tire air pressure and said temperature on said mobile app;
displaying said tire air pressure and said temperature on said mobile app;
comparing said tire air pressure with said temperature;
using said mobile app to recommend a change to said tire air pressure based on a change to said temperature; and
adjusting the tire air pressure in accordance with the recommendation; and
wherein the gauge device comprises a body, a threaded member, a pressure sensor, a temperature sensor, and a circuit board assembly; and
wherein the body comprises a first half and a second half attachable to the first half; and
wherein the first half comprises a continuous opening, a pair of anti-rotational indents, and a fixed spacer ring; and
wherein the threaded member is attached to the first half of the spherical body at the continuous opening; and
wherein the second half of the spherical body comprises a central internal cavity configured to retain the circuit board assembly, the pressure sensor, and the temperature sensor.

14. The method of claim 13, wherein said temperature is an internal tire temperature, and said change to said tire air pressure comprises an increase to said tire air pressure to correspond to a decrease in said internal tire temperature.

15. The method of claim 14, wherein said change to said tire air pressure comprises an increase to said tire air pressure of one PSI for every 10 degree decrease in said internal tire temperature.

16. The method of claim 15, wherein said change to said tire air pressure comprises a decrease to said tire air pressure to correspond to an increase in said internal tire temperature.

17. The method of claim 16, wherein said change to said tire air pressure comprises a decrease to said tire air pressure of one PSI for every 10 degree increase in said internal tire temperature.

18. The method of claim 13, wherein said temperature is an ambient temperature, and said change to said tire air pressure comprises an increase or a decrease to said tire air pressure to correspond to a decrease or an increase, respectively, in said ambient temperature.

* * * * *